W. A. JONES.
GLASS DRAWING APPARATUS.
APPLICATION FILED DEC. 11, 1911.
1,050,544.
Patented Jan. 14, 1913
2 SHEETS—SHEET 2.
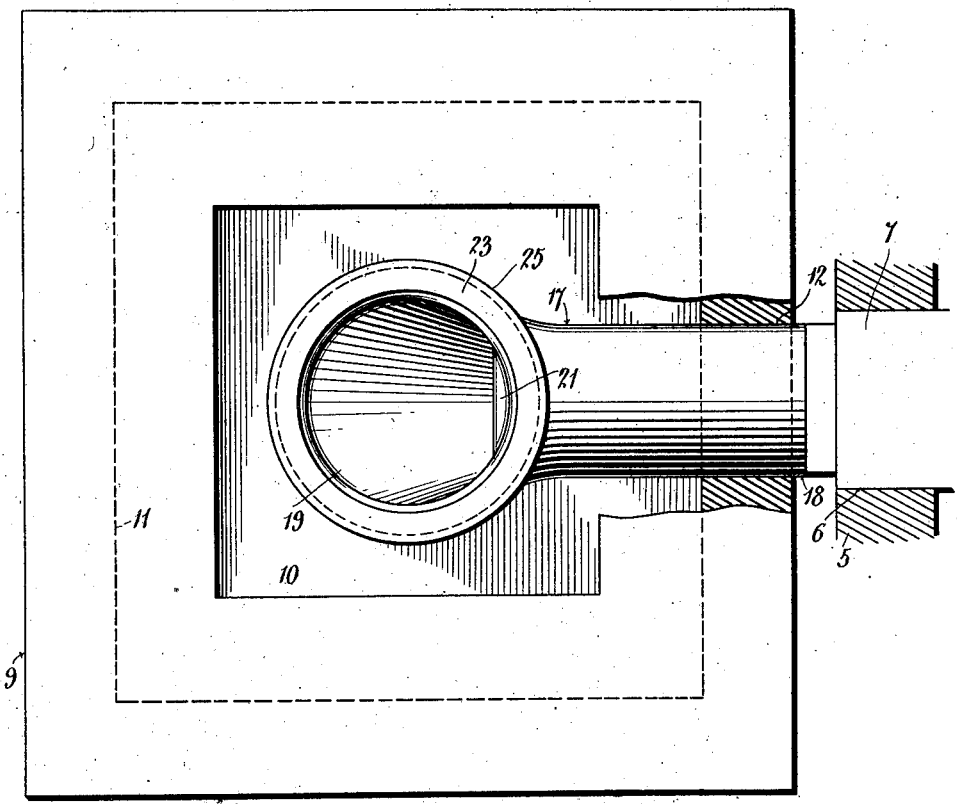
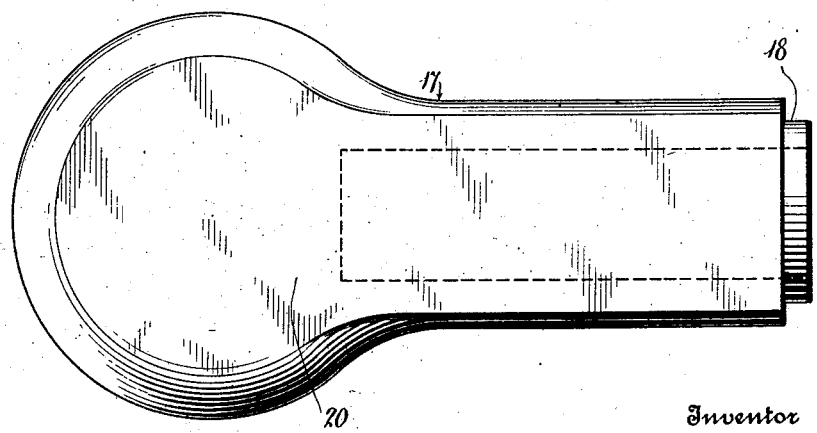

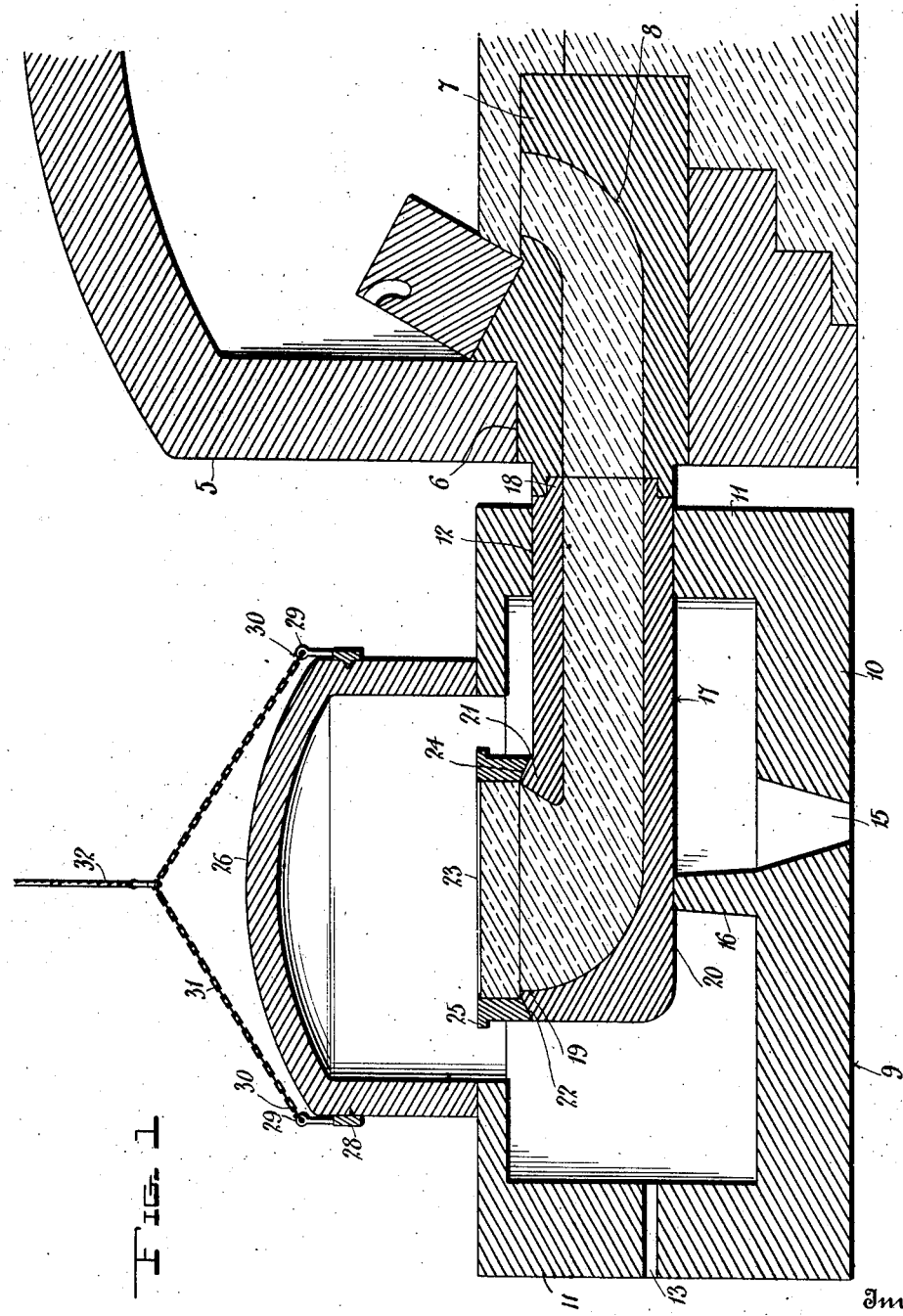

UNITED STATES PATENT OFFICE.

WALTER A. JONES, OF COLUMBUS, OHIO.

GLASS-DRAWING APPARATUS.

1,050,544. Specification of Letters Patent. Patented Jan. 14, 1913.

Application filed December 11, 1911. Serial No. 665,095.

*To all whom it may concern:*

Be it known that I, WALTER A. JONES, a citizen of the United States, residing at Columbus, in the county of Franklin, State of Ohio, have invented certain new and useful Improvements in Glass-Drawing Apparatus; and I do hereby declare the following to be a full, clear, and exact description of the invention, such as will enable others skilled in the art to which it appertains to make and use the same.

This invention relates to an improvement in glass drawing apparatus generally, and is more particularly in the nature of an improvement upon Patent No. 970,633, granted Sept. 20, 1910, to L. Mambourg and U. Houze.

It is a well known fact that in drawing cylindrical or other shells from a continuously supplied pot, the refuse glass resulting from the separation of the drawn shell becomes cooled and consequently a portion of the refuse adheres to the walls of the pot and the remainder falls into the molten glass within the pot. As a result of this condition it has been found that it is a practical impossibility to draw the next shell from the pot without first eliminating such refuse from the pot and from the walls thereof. In practice it has been necessary to employ a ladle for removing all of such refuse. This operation necessarily requires a great amount of time and occasions a considerable loss to the manufacturer.

The principal object of the invention is to provide a glass drawing apparatus of such a construction as to permit of the removal of that refuse within the pot as well as that which is adhered to the walls thereof.

Another object of the invention is to provide a glass drawing apparatus which includes a continuously supplied pot having a removable wall whereby upon the elevation thereof after the shell has been broken, the molten glass from the furnace will readily flow over the bottom of the pot and thereby carry off with it the refuse contained within the pot and also that which has become adhered to the walls of the mouth thereof.

Another object of the invention is to provide a pot for the purpose described which is provided with a removable wall, the corresponding abutting edges of the bottom and the wall being of such construction as to readily permit not only the centering of the wall upon the bottom but of retaining the same against accidental displacement.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a vertical section of a glass drawing apparatus constructed in accordance with my invention. Fig. 2 is a top plan view of the pot and the furnace surrounding the same, the cover being removed to better show the invention, Fig. 3 is a bottom plan view of the bottom of the pot.

Like reference numerals designate corresponding parts in all the figures of the drawings.

Referring to the drawings, 5 designates any suitable tank for containing molten glass. Formed in one wall thereof is an opening 6 in which is disposed a nose-block 7 having a conduit 8 which forms an outlet for the glass from the tank.

Disposed in spaced relation to the tank and contiguous to the nose-block 7 is a furnace 9 having a bottom 10 and walls 11. Formed in the wall 11 adjacent the opening 6 of the tank 5 is a lateral opening 12. Also formed in the walls 11 above the bottom 10 is a plurality of spaced openings 13, and in each opening there is disposed a burner of any suitable type. Formed in the bottom 10 is a discharge opening 15 and integral with said bottom and projecting upwardly therefrom is a support 16.

Disposed within the opening 12 of the furnace 9 is a pipe section 17, the outer end 18 thereof being connected to the nose-block 7, and the inner end projecting into the furnace 9 in spaced relation to the walls thereof and formed with an enlarged upwardly extending horizontal mouth 19. The bottom face 20 of the pipe section 17 is flat and the inner end of said section is seated upon the support 16. The mouth 19 projects above the plane of the pipe 17 to form a circular flange 21, the outer face 22 thereof being outwardly and downwardly inclined to form a seat.

My invention further comprises a removable circular wall 23 having an undercut lower edge 24 corresponding to and adapted to fit upon the seat of the mouth 19. The upper edge of the wall 23 is formed with an outwardly extending peripheral flange 25. It will thus be observed that the wall 23 together with the mouth 19 conjointly form a glass receiving pot from which shells may be drawn. A bowl-shaped cover 26 is seated upon the walls 11 of the furnace 9, and this cover includes a metal band 28 having a plurality of eyes 29 secured thereto and adapted to be engaged by hooks 30 carried by hoisting chains 31 which in turn are connected to a hoisting cable 32, said cable being actuated by any suitable means (not shown).

In practice, the molten glass flows from the furnace 5 through the conduit 8 of the nose-block 7 into the pipe section 17, thence through the mouth 19 to within the removable wall 23. The burners are employed for the purpose of keeping the molten glass within the pot in a proper condition to permit of a shell being drawn. When it is desired to draw a shell, the cover 26 is removed by means of the hoisting cable 32 and the shell is then drawn from the glass within the pot. After the shell has been broken, the hooks 29 of the hoisting cable 32 are then engaged with the peripheral flange 25 of the removable wall 23, and this wall is then elevated. As a result, the molten glass will flow from the furnace 5 over the flange 21 of the mouth 19 and carry off all refuse glass with it. This molten glass together with the refuse passes down into the furnace 9 and is thence directed therefrom through the outlet 15 to any suitable place where it may be reheated. The removable wall 23 is then lowered in place, and the operator is then ready to draw the next shell. It is to be observed that by means of this construction shells may be successively drawn without any danger of creating flaws therein owing to the presence of refuse glass.

What is claimed:

1. The combination with a glass tank, of a housing adjacent thereto forming an independent heating chamber, a drawing pot in said chamber and means for continuously supplying the pot with molten glass from the tank, said drawing pot including a removable wall portion disposed entirely out of engagement with said housing and having its upper and lower edges positioned above and below the normal level of the glass in the tank whereby said wall portion may be displaced independent of the displacement of any portion of the housing to effect a draining of the glass at the extreme top of the drawing pot.

2. The combination with a glass tank, of a housing forming an independent heating chamber and having an opening in its top wall, a drawing pot in said heating chamber, means for continuously supplying the pot with molten glass from the tank, said drawing pot including a removable wall portion projecting into the opening in the top of the housing and having its outer face disposed in spaced relation to the wall of said opening and further having its upper and lower edges positioned above and below the normal level of the glass in the tank whereby said wall portion may be displaced independent of the displacement of the housing to effect a draining of the glass at the extreme top of the drawing pot.

In testimony whereof, I affix my signature, in presence of two witnesses.

WALTER A. JONES.

Witnesses:
H. M. POPHAM,
FRANCIS BOYLE.

---

Copies of this patent may be obtained for five cents each, by addressing the "Commissioner of Patents, Washington, D. C."